UNITED STATES PATENT OFFICE.

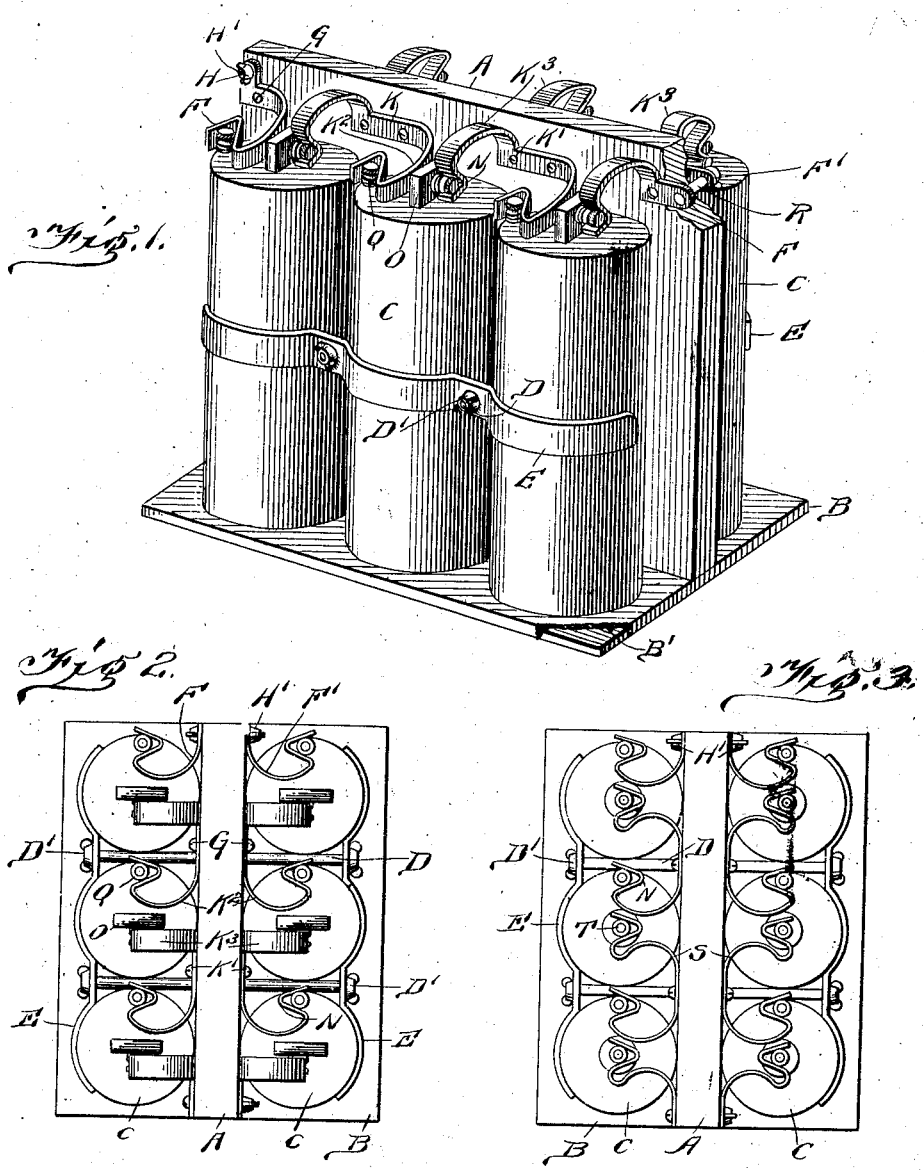

CARL T. MASON, OF SUMTER, SOUTH CAROLINA, ASSIGNOR OF ONE-HALF TO GEORGE C. WARREN, OF SUMTER, SOUTH CAROLINA.

BATTERY-HOLDER.

954,119.  Specification of Letters Patent.  Patented Apr. 5, 1910.

Application filed March 20, 1909. Serial No. 484,309.

*To all whom it may concern:*

Be it known that I, CARL T. MASON, a citizen of the United States, residing at Sumter, in the county of Sumter and State of South Carolina, have invented certain new and useful Improvements in Battery-Holders; and I do hereby declare the following to be a full, clear, and exact description of the invention, such as will enable others skilled in the art to which it appertains to make and use the same, reference being had to the accompanying drawings, and to the letters and figures of reference marked thereon, which form a part of this specification.

This invention relates to new and useful improvements in battery holding and connector apparatus, and comprises a one-piece cell connector connecting the carbon of one cell with the zinc in the adjacent cell, the cell connector making contact on the metal posts or terminals of the respective elements of the batteries.

The invention comprises various details of construction and combinations and arrangements of parts which will be hereinafter fully described and then specifically defined in the appended claim.

My invention is illustrated in the accompanying drawings, in which:—

Figure 1 is a perspective view showing a series of batteries mounted and connected by my improved battery holding and connector apparatus. Fig. 2 is a top plan view of the apparatus, and Fig. 3 is a slight modification illustrating vertically disposed carbon terminals of the batteries.

Reference now being had to the details of the drawings by letter, A designates an upright piece of any suitable insulating material having a plate B fastened to the lower edge thereof, which plate, preferably of metal, is covered with a suitable enamel B'. C, C designate a series of cells which are mounted upon said plate upon either side of said upright board, and bolts D, preferably enameled for insulation where they are likely to come in contact with said cells, are passed through the board, and cell retaining clamping bars E, preferably enameled or otherwise insulated, are provided to engage the cells of said series and each of said bars is provided with apertures for the reception of the bolts D and winged nuts D' are fitted to the threaded ends of the bolts and serve to bear against the outer faces of said bars for the purpose of holding the latter in clamping relation against the circumference of the cells. By tightening the nuts, the two series of cells located on opposite sides of the upright board A may be drawn and held in contact with the opposite sides of the latter. Secured to said upright board at any suitable locations are the metallic contact terminal springs F and F', held to said board by means of screws G engaging the board A, and H designates a terminal bolt passing through said board and engaging an aperture in one of the springs F, and H' designates a winged nut mounted upon said terminal bolt H. Positioned at any suitable locations upon said board, preferably between the various cells, are the spring contact plates K held in place by means of screws K' which engage the board, and each arm of the springs K which are resilient, is bent at N to form a convenient means whereby they may engage frictionally the carbon and zinc terminals of the cells.

In Fig. 1 of the drawings, O designates the carbon terminal of a cell, and Q designates the zinc terminal of a cell and one arm K' of each spring K engages the carbon terminal of a cell, while the other arm K² of each spring engages the zinc terminal of the adjacent cell throughout the series, the various cells in each series being similarly connected. A second and common terminal bolt, designated by letter R, passes through the upright board and is adapted to connect the two terminal springs F and F' at the end of each series.

In Fig. 3 of the drawings, I have shown a slight modification of my invention in which the cells are provided with vertically disposed carbon terminals T which are at present commonly in vogue, and in said modified form the springs S, which are fastened to the board A, are disposed upon edge rather than angled, as shown in Fig. 1 of the drawings.

From the foregoing it will be noted that by the provision of battery holders and connectors as shown, a one-piece spring is held by the resiliency of the material of which the springs are composed against the carbon of one cell and the zinc of the adjacent cell, while at the same time, the cell connector makes contact on the metal posts or terminals of the respective elements of the batteries, whereas heretofore all cell connectors have required either a special battery, or those in which the metal part of the connectors do not make contact with the metal terminals of the cells.

By my invention, the cells are clamped in the manner shown and described and thoroughly insulated, and it will not be necessary or advisable to remove the pasteboard covers of the cells. When the cells are clamped in place, the carbon and zinc elements thereof are brought into mechanical and electrical contact with the connector springs, and they are so associated with the cells in series that the current may be taken off at the terminals.

What I claim to be new, is:—

In combination with a cell holder, a series of cells having metal terminals attached to the carbon and zinc elements thereon, a board rising from said holder, one-piece connectors fastened to said board and having free ends, one of which is in contact with the metal terminals of the carbon terminal of one cell and its other end in contact with the metal terminals of the zinc terminal of an adjacent cell, clamping bars engaging said cells and bolts holding said bars in clamping engagement with the cells, as set forth.

In testimony whereof I hereunto affix my signature in the presence of two witnesses.

CARL T. MASON.

Witnesses:
  E. M. HALL,
  H. B. VAN DEVENTER.